(12) United States Patent
Fujita et al.

(10) Patent No.: US 10,823,234 B2
(45) Date of Patent: Nov. 3, 2020

(54) ANNULAR MEMBER STOPPING STRUCTURE FOR FRICTION ENGAGING DEVICE

(71) Applicants: HONDA MOTOR CO., LTD., Tokyo (JP); NSK-Warner K.K., Tokyo (JP)

(72) Inventors: Takahiro Fujita, Saitama (JP); Soichi Sugino, Saitama (JP); Satoshi Kato, Saitama (JP); Hidetoshi Nagamine, Tokyo (JP); Tomoyuki Kirino, Shizuoka (JP); Moriya Suzuki, Shizuoka (JP)

(73) Assignees: HONDA MOTOR CO., LTD., Tokyo (JP); NSK-WARNER K.K., Tokyo (JP)

( * ) Notice: Subject to any disclaimer, the term of this patent is extended or adjusted under 35 U.S.C. 154(b) by 179 days.

(21) Appl. No.: 15/944,309

(22) Filed: Apr. 3, 2018

(65) Prior Publication Data

US 2018/0298955 A1 Oct. 18, 2018

(30) Foreign Application Priority Data

Apr. 14, 2017 (JP) .................................. 2017-080814

(51) Int. Cl.
*F16D 13/58* (2006.01)
*F16H 57/10* (2006.01)
(Continued)

(52) U.S. Cl.
CPC ............. *F16D 13/58* (2013.01); *F16H 57/10* (2013.01); *F16D 13/52* (2013.01);
(Continued)

(58) Field of Classification Search
None
See application file for complete search history.

(56) References Cited

U.S. PATENT DOCUMENTS

| 3,321,999 A | * | 5/1967 | Greer | .................. F16D 25/0638 475/159 |
| 2015/0226272 A1 | * | 8/2015 | Heuver | .................. F16D 13/646 192/66.3 |
| 2015/0345635 A1 | * | 12/2015 | Heuver | ............... F16H 63/3026 192/70.11 |

FOREIGN PATENT DOCUMENTS

| JP | 8-145147 A | 6/1996 |
| JP | 2007-333021 A | 12/2007 |
| JP | 2011-169336 A | 9/2011 |

OTHER PUBLICATIONS

Office Action dated Sep. 15, 2020, issued in counterpart JP Application No. 2017-080814, with English translation. (6 pages).

* cited by examiner

*Primary Examiner* — Mark A Manley
(74) *Attorney, Agent, or Firm* — Westerman, Hattori, Daniels & Adrian, LLP

(57) ABSTRACT

An annular member stopping structure for a friction engaging device includes an end plate 212, a plurality of projecting sections 218 projecting in a radial direction at intervals in a circumferential direction on the end plate 212, a drum 112 having hook parts 220 configured to engage with the projecting sections 218, the drum 112 being non-rotatable relative to the end plate 212, an annular groove 214 provided in the drum 112, and a C-shaped snap ring 216 configured to fit in the annular groove 214. A circumferential direction abutting section 226 freely abutting with circumferential direction end 216a of the snap ring 216 is provided in the end plate 212.

5 Claims, 13 Drawing Sheets

(51) Int. Cl.
*F16H 63/34* (2006.01)
*F16H 3/66* (2006.01)
*F16D 13/52* (2006.01)
*F16D 25/0638* (2006.01)
*F16D 69/04* (2006.01)

(52) U.S. Cl.
CPC ............ *F16D 25/0638* (2013.01); *F16H 3/66* (2013.01); *F16H 63/3483* (2013.01); *F16H 2200/2012* (2013.01); *F16H 2200/2048* (2013.01); *F16H 2200/2066* (2013.01); *F16H 2200/2082* (2013.01)

(COMPARATIVE EXAMPLE)

ANNULAR MEMBER STOPPING STRUCTURE FOR FRICTION ENGAGING DEVICE

BACKGROUND OF THE INVENTION

Field of the Invention

The present invention relates to an annular member stopping or retaining structure for a friction engaging device such as a clutch or brake.

Description of the Related Art

Conventionally, structures have been known where a C-shaped stopper ring is stopped by a drum of a friction engaging device so that an end plate as an annular member does not fall off from the drum (for example, refer to Japanese Patent Laid-Open No. 2011-169336).

Moreover, structures have also been known where external hooks projecting to the outside in a radial direction are provided on a stopper ring, in order to stop rotation of the stopper ring, and these external hooks are fitted in a concave part provided in a drum (for example, refer to Japanese Patent Laid-Open No. H08-145147).

SUMMARY OF THE INVENTION

In a conventional annular member stopping structure for a friction engaging device, rotation of a stopper ring is prevented by providing a radial direction concave part in a support section such as a drum or hub. However, since the stopper ring freely expands or contracts in the radial direction, the hooks of the stopper ring will easily slip out from the radial direction concave part, and there will be the problem of the stopper ring rotating.

The present invention takes into consideration the above point, and provides an annular member stopping structure for a friction engaging device that can surely prevent rotation of a stopper ring more than in a conventional structure.

[1] In order to achieve the above objective, the present invention is an annular member stopping structure for a friction engaging device, including:

an annular member (for example, end plate 212 of the embodiments; hereinafter called the same);

a plurality of projecting sections (for example, projecting sections 218 of the embodiments; hereinafter called the same) projecting in a radial direction at intervals in a circumferential direction on the annular member;

a support section (for example, drum 112 of the embodiments; hereinafter called the same) having engagement sections (for example, hook parts 220 of the embodiments; hereinafter called the same) configured to engage with the projecting sections, the support section being non-rotatable relative to the annular member;

an annular groove (for example, annular groove 214 of the embodiments; hereinafter called the same) provided in the support section; and a C-shaped stopper ring (for example, snap ring 216 of the embodiments; hereinafter called the same) configured to fit in the annular groove;

wherein a circumferential direction abutting section (for example, circumferential direction abutting section 226 of the embodiments; hereinafter called the same) capable of abutting with a circumferential direction end (for example, circumferential direction end 216a of the embodiments; hereinafter called the same) of the stopper ring is provided in the annular member.

According to the present invention, the circumferential direction end of the stopper ring abut with the circumferential direction abutting section. Therefore, an annular member stopping structure for a friction engaging device can be provided that can prevent rotation of the stopper ring, regardless of expansion-contraction of the stopper ring. Note that, while the C-shape is shown as an annular shape with a part that is non-continuous, it may be a circular shape or a cornered shape.

[2] Moreover, generally, a small curved surface is sometimes formed at a connection portion between an axial direction surface of the annular member and the circumferential direction abutting section. When the circumferential direction end of the stopper ring contact with this curved surface, the stopper ring will move by having the circumferential direction end of the stopper ring move, and there is the possibility that the annular member will not be able to be firmly stopped by the stopper ring.

Accordingly, in the present invention, it is preferable for a concave part (for example, concave part 228 of the embodiments; hereinafter called the same) configured to inhibit contact with the circumferential direction end of the stopper ring to be provided at a connection portion between an axial direction surface of the annular member and the circumferential direction abutting section.

According to such a configuration, by providing the concave part, contact can be inhibited between the curved surface of a connection portion between the axial direction surface of the annular member and the circumferential direction abutting section, and the circumferential direction end of the stopper ring. Therefore, the circumferential direction end of the stopper ring can be prevented from moving, by having the circumferential direction end of the stopper ring contact with the curved surface.

[3] Moreover, in the present invention, it is preferable for the concave part to have a plane surface on a same plane surface (for example, same plane surface 228a of the embodiments; hereinafter called the same) as an abutting surface (for example, abutting surface 226a of the embodiments; hereinafter called the same) of the circumferential direction abutting section configured to abut with the circumferential direction end of the stopper ring, and to be recessed in an axial direction of the annular member.

If the concave part is formed so as to be recessed toward a circumferential direction, there is the possibility that the strength of the circumferential direction abutting section will decrease, and processing of the concave part will be difficult. If the concave part is formed, so as to have a plane surface on a same plane surface as the abutting surface of the circumferential direction abutting section configured to abut with the circumferential direction end of the stopper ring, and be recessed in an axial direction of the annular member, a decrease in strength of the circumferential direction abutting section can be suppressed, and the concave part can be easily processed.

[4] Moreover, in the present invention, it is preferable for the concave part to include a bored part deeply indented in a radial direction.

According to such a configuration, the concave part can be easily formed without considering the generation of burring, compared to the case where the concave part is formed shallowly in a radial direction.

[5] Moreover, in the present invention, it is preferable for an expansion-contraction limiting section (for example, contraction limiting section 232 of the embodiment; hereinafter called the same) capable of abutting with the stopper ring front a radial direction so as to limit an expansion or contraction in a radial direction of the stopper ring to be provided in the annular member, and a clearance part (for example, clearance part 236 of the embodiments; hereinafter called the same) having an interval with the stopper ring so as to inhibit contact with the stopper ring to be provided at a connection part between an abutting surface of the expansion-contraction limiting section capable of abutting with the stopper ring and the deeply-bored part (for example, deeply-bored part 228b of the embodiments; hereinafter called the same) of the concave part.

According to such a configuration, contact with the stopper ring can be suppressed or prevented even if burring or the like is generated at a connection part between an expansion-contraction part and a deeply-bored part.

[6] Moreover, in the present invention, it is preferable for the circumferential direction abutting section to be provided between adjacent projecting sections, and an interval between the circumferential direction end of the stop ring to be set to be smaller than an interval between the circumferential directions of the projecting sections.

According to such a configuration, even if there is a portion where an annular groove has been cut out, where the stopper ring rotates and is positioned between the circumferential direction end, both of the circumferential direction ends of the stopper ring can be prevented from falling out in an axial direction from the cutout portion.

[7] Moreover, in the present invention, it is preferable for the circumferential direction abutting section to be formed by positioning at a location where an interval between the circumferential directions of the projecting sections is longest.

According to such a configuration, the circumferential direction end of the stopper ring can be firmly held down by the annular groove.

[8] Moreover, in the present invention, it is preferable for the circumferential direction abutting section to be provided near a gear (for example, gear 222 of the embodiments; hereinafter called the same).

In the case where there is a gear nearby, it will be required to make the space between adjacent projecting sections wide, in order to avoid having the projecting sections of the annular member interfere with the gear. By arranging the circumferential direction abutting section at a location where such projecting sections are unable to be provided, miniaturization of the whole device can be attempted.

BRIEF DESCRIPTION OF THE DRAWING(S)

Figure 12:
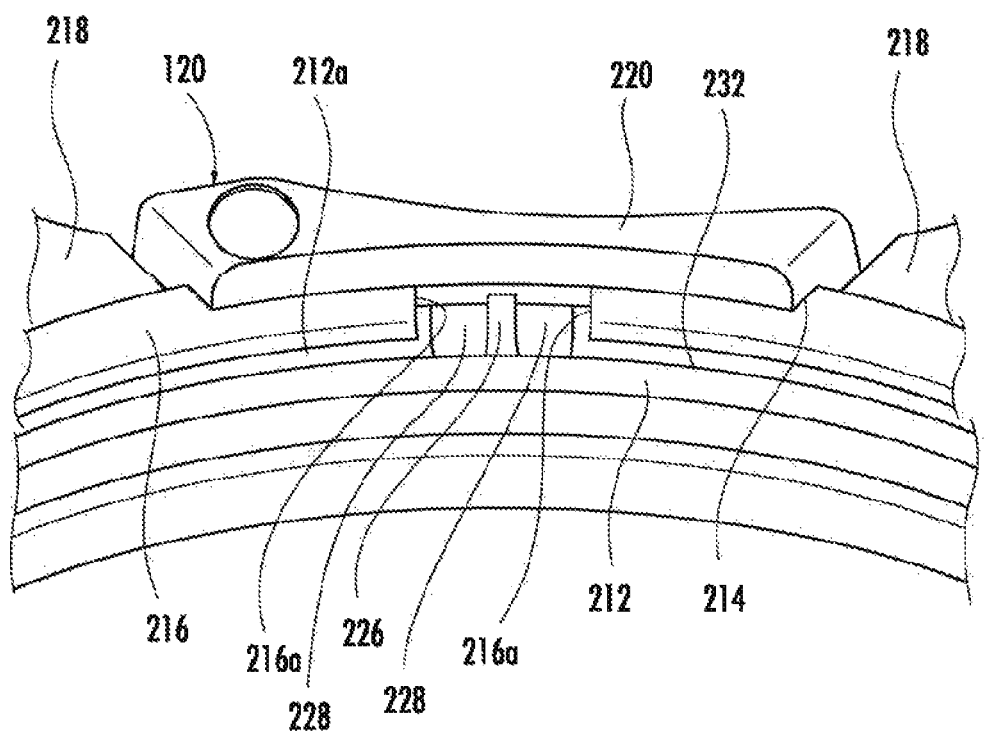
Figure 13:
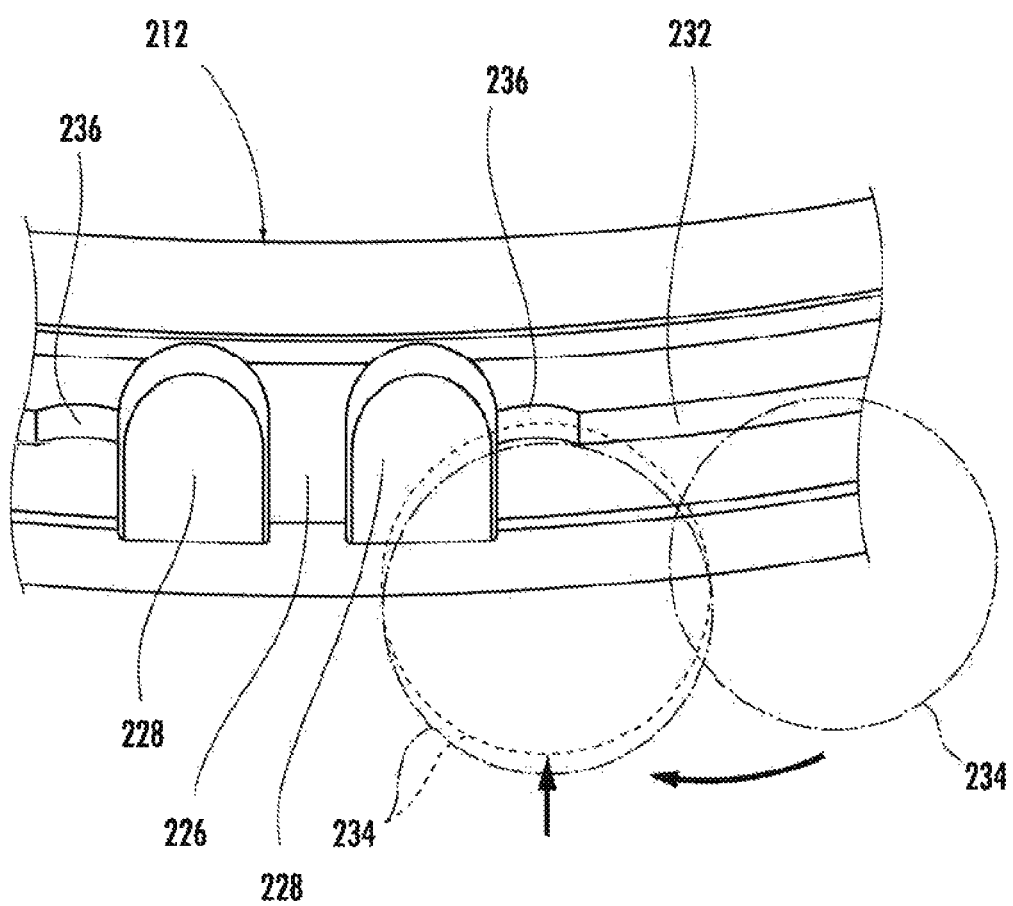

FIG. 12 is an explanatory view that shows a circumferential direction length dimension of an annular groove of a hook part, and a distance between two of the circumferential direction end of the snap ring, for the circumferential direction abutting section; and FIG. 13 is an explanatory view that shows a movement track of a milling process tool in the case where forming a contraction limiting section by the milling process tool.

DETAILED DESCRIPTION OF THE PREFERRED EMBODIMENTS

Hereinafter, a description will be made for a transmission applying an embodiment of an annular member stopping (retaining) structure for a friction engaging device of the present invention, and a vehicle in which is mounted this transmission, by referring to the Figures.

Figure 1:
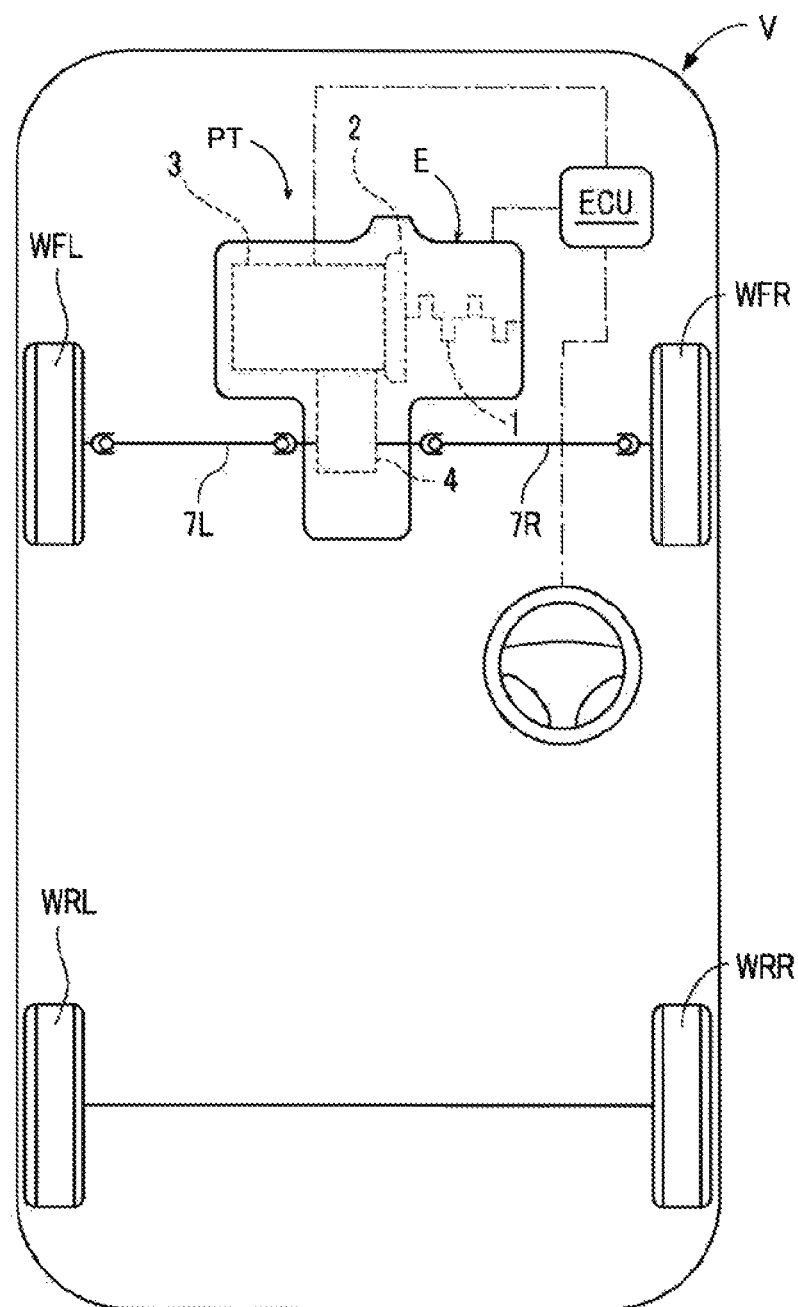
FIG. 1 is an explanatory drawing that shows a vehicle in which is mounted a transmission applying an embodiment of an annular member stopping structure for a friction engaging device of the present invention.

As shown in FIG. 1, a vehicle V in which is mounted a transmission applying an annular member stopping structure for a friction engaging device of the present embodiment has an engine E (internal combustion engine, driving source. An electric motor may be used instead of the engine E) mounted on a vehicle body with a crankshaft 1 horizontally placed so as to face the left-right direction of the vehicle body. A driving force output from the engine E is transmitted to a power transmission device PT. Also, the power transmission device PT adjusts the driving force of the engine E in accordance with a selected transmission ratio to be transmitted to left and right front wheels WFL, WFR.

The power transmission device PT is composed of an automatic transmission 3 having a torque converter 2 connected to the crankshaft 1, and a front differential gear 4 connected to the automatic transmission 3.

The front differential gear 4 is connected to the left and right front wheels WFL, WFR via a front left axle 7L and a front right, axle 7R.

Figure 2:
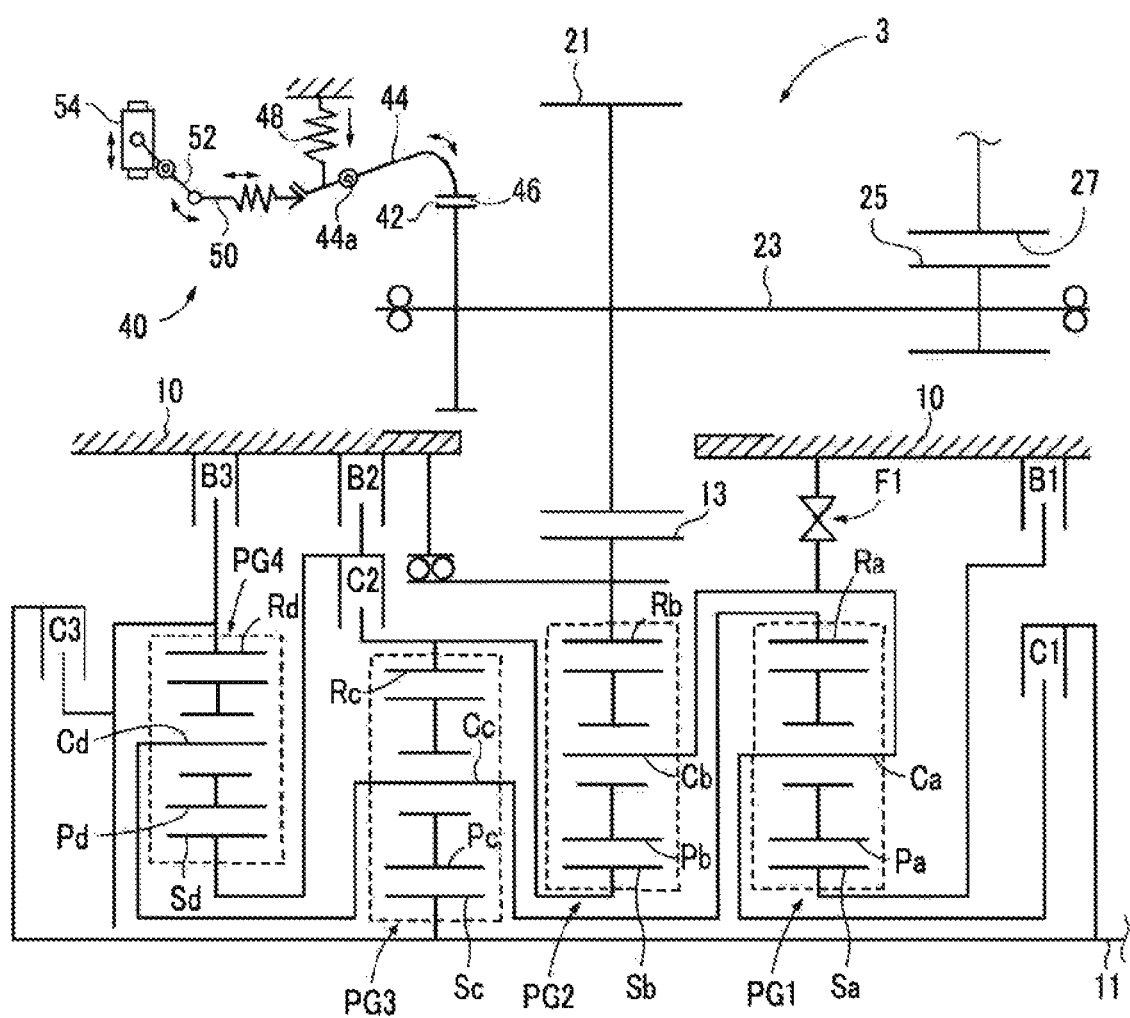
FIG. 2 is a skeleton view that shows the transmission of the present embodiment.

FIG. 2 is a skeleton view that shows a portion of the automatic transmission 3 with the torque convertor 2 removed. This automatic transmission 3 includes an input axle 1 as an input section, freely rotatably supported within a transmission case 10 as a housing, for a driving force output by the engine E to be transmitted via the torque convertor 2 having a lockup clutch and damper, and an output member 13 (output section) consisting of output gears arranged concentrically with the input axle 11. Note that, the vehicle may be a hybrid-power vehicle, arranged with an electric motor instead of the torque convertor 2, for travelling with the internal combustion engine and the electric motor as driving sources.

Rotation of the output member 13 is transmitted to left and right driving wheels (front wheels WFL, WFR) of the vehicle via the front differential gear 4, which includes an idle gear 21 that meshes with the output member 13, an idle axle 23 that supports the idle gear 21, a final driving gear 25 supported by the idle axle 23, and a final driven gear 27 that meshes with the final driving gear 25. Note feat, a single-plate or multi-plate starting clutch constituted to freely and frictionally engage may be provided instead of the torque converter 2. Moreover, this configuration can be applied to a rear-wheel-drive vehicle, by connecting a propeller shaft instead of the front differential gear 4. Moreover, this configuration can be applied to a four-wheel-drive vehicle, by connecting a propeller shaft instead of the front differential gear 4.

First to fourth planetary gear mechanisms PG1-PG4 are arranged concentrically with the input axle 11 in order from a driving source ENG side, within the transmission case 10 as a housing. The first to fourth planetary gear mechanisms PG1-PG4 are composed of so-called single pinion type planetary gear mechanisms, which consist of respective sun gears Sa, Sb, Sc, and Sd, ring gears Ra, Rb, Rc, and Rd, and carriers Ca, Cb, Cc, and Cd freely rotatably and revolvingly supporting pinion gears Pa, Pb, Pc, and Pd that mesh with the sun gears Sa-Sd and the ring gears Ra-Rd.

Moreover, the automatic transmission 3 of the present embodiment includes a parking lock mechanism 40. A parking gear 42 of the parking lock mechanism 40 is fixed to the idle axle 23 so as to integrally rotate. A parking pole 44 pivotally supported by a supporting axle 44a is arranged in the vicinity of the parking gear 42. A locking hook 46 is provided on the end part of the parking gear 42 of the parking pole 44. By having this locking hook 46 engage with the parking gear 42, the driving wheels (front wheels WFL, WFR) will be in a state where the driving wheels cannot be rotated via the idle axle 23 (parking lock state). The parking pole 44 is biased by a separation spring 48 in a direction where the locking hook 46 is separated from the parking gear 42.

A cam 50 is arranged at the other end of the parking pole 44 to freely move forward and backward. By having the cam 50 move forward, the parking pole 44 swings against the biasing force of the separation spring 48, and the locking hook 46 engages with the parking gear 42. By having the cam 50 move backward, the parking pole 44 returns to the original position by the biasing force of the separation spring 48, and the engagement between the locking hook 46 and the parking gear 42 is released.

A parking piston 54 is connected to the cam 50 via a link 52. The parking piston 54 is composed to freely move in its own axial direction by hydraulic pressure. Also, the cam 50 is composed so as to perform forward and backward movement operations via the link 52 by having the parking piston 54 move in an axial direction.

Moreover, the automatic transmission of the present embodiment includes seven engaging mechanisms consisting of first to third clutches C1-C3, first to third brakes B1-B3, and a two-way clutch F1.

The first clutch C1 is a hydraulically operating type multi-plate wet clutch, and is composed to freely change between a connection state that connects between the sun gear Sc (first element) of the third planetary gear mechanism PG3 and a third connection body Ca-Cb, and an opened state where this connection is cut.

The third clutch C3 is a hydraulically operating type multi-plate wet clutch, and is composed to freely change between a connection state that connects between the sun gear Sc (first element) of the third planetary gear mechanism PG3 and the ring gear Rd (fourth element) of the fourth planetary gear mechanism PG4, and an opened state where this connection is cut.

The second clutch C2 is a hydraulically operating type multi-plate wet clutch, and is composed to freely change between a connection state that connects between the sun gear Sd (sixth element) of the fourth planetary gear mechanism PG4 and a second connection body Rc-Sb, and an opened state where this connection is cut.

The two-way clutch F1 is included also with a function as a fourth brake B4, allows normal rotation of the third connection body Ca-Cb (rotation in a direction the same as the rotation direction of the input axle 11 and/or the output member 13), and is composed to freely change between a reverse-rotation inhibiting state that inhibits reverse rotation, and a fixed state where the third connection body Ca-Cb is fixed to the transmission case 10.

Inthe case where a force is added, in the reverse-rotation inhibiting state, to rotate the third connection body Ca-Cb in a normal rotation direction, the two-way clutch F1 will be in an opened state where this rotation is allowed, and in the case where a force is added to rotate the third connection body Ca-Cb in a reverse rotation direction, the two-way clutch F1 will be in a fixed state where fixed to the transmission case 10 in which this rotation is inhibited.

The first brake B1 is a hydraulically operating type multi-plate wet brake, and is composed to freely change between a fixed state where the sun gear Sa (seventh element) of the first planetary gear mechanism PG1 is fixed to the transmission case 10, and an opened state where this fixing is released.

The second brake B2 is a hydraulically operating type multi-plate wet brake, and is composed to freely change between a fixed state where the sun gear Sd (sixth element) of the fourth planetary gear mechanism PG4 is fixed to the transmission case 10, and an opened state where this fixing is released. The third brake B3 is a hydraulically operating type multi-plate wet brake, and is composed to freely change between a fixed state where the ring gear Rd (fourth element) of the fourth planetary gear mechanism PG4 is fixed to the transmission case 10, and an opened state where this fixing is released.

Each of the clutches C1-C3, each of the brakes B1-B3, and the two-way clutch F1 have states that change, based on vehicle information such as the travelling speed of the vehicle transmitted from an integrated control unit or the like, which is omitted in the Figures, by a speed change control device ECU composed of a transmission control unit (TCU) shown in FIG. 1.

The speed change control device ECU is composed of an electronic unit constituting a CPU, memory or the like, which is omitted in the Figures, and controls the automatic transmission 3 (transmission mechanism) by executing control programs retained in a storage device such as a memory by the CPU, along with being able to receive prescribed vehicle information such as the travelling speed and accelerator position of the vehicle V, the rotation speed and output torque of the engine E, and operation information of a paddle shift lever.

As shown in FIG. 2, on the axial line of the input axle 11, there is an arrangement in the order of the first clutch C1, the first planetary gear mechanism PG1, the second planetary gear mechanism PG2, the third planetary gear mechanism PG3, the second clutch C2, the fourth planetary gear mechanism PG4, and the third clutch C3, from the driving source ENG and torque converter 2 side.

Also, the third brake B3 is arranged on the outside of the fourth planetary gear mechanism PG4 in a radial direction, the second brake B2 is arranged on the outside of the second clutch C2 in a radial direction, the first brake B1 is arranged on the outside of the first clutch C1 in a radial direction, and the two-way clutch F1 is arranged on the outside of the first planetary gear mechanism PG1 in a radial direction.

Figure 3:
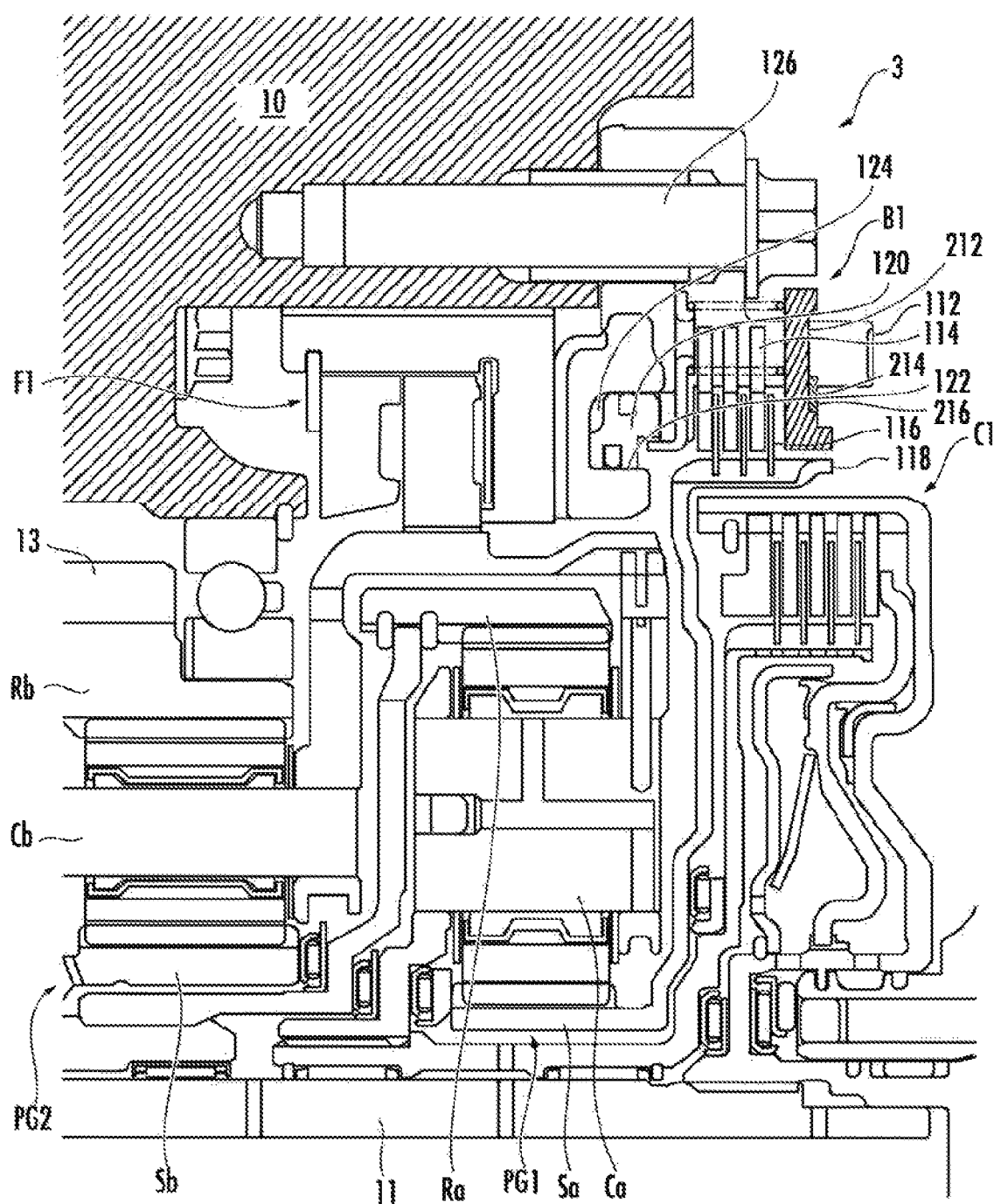
FIG. 3 is a cross-sectional view that enlargedly shows a two-way clutch and a first brake.

In this way, by arranging the three brakes B1-B3 and the two-way clutch F1 on the outside of the planetary gear mechanisms or the clutches in a radial direction, shortening of the axle length of the automatic transmission 3 can be attempted, compared to the case where the brakes B1-B3 and the two-way clutch F1 are arranged in line on an axial line of the input axle 11 along with the planetary gear mechanisms and the clutches. Note that, the third brake B3 may be arranged on the outside of the third clutch C3 in a radial direction, and the second brake B2 may be arranged on the outside of the fourth planetary gear mechanism PG4 in a radial direction, FIG. 3 is a cross-sectional view that enlargedly shows the two-way clutch F1 and the first brake B1. As shown in FIG. 3, the first brake B1 includes a drum 112 fixed to the transmission case 10, an outer plate 114 fixed non-rotatably relative to the drum 112, an inner disk 116 capable of contacting with the outer plate 114 from an axial direction, and a hub 118 fixed non-rotatably relative to the inner disk 116.

The drum 112 is composed of a separate body to the transmission case 10. Moreover, the drum 112 includes a piston arrangement section 122 capable of arranging a piston 120, and defines a hydraulic chamber 124 by the piston arrangement section 122 and the piston 120.

Moreover, the first brake B1 includes an end plate 212 fixed non-rotatably relative to the drum 112, similar to the outer plate 114. The end plate 212 is arranged to be capable of frictionally contacting with the inner disk 116 positioned the farthest away from the piston 120, and is arranged separated from the piston 120 more than the outer plate 114 positioned the furthest away from the piston 120. Moreover, in the drum 112, an annular groove 214 is formed on the inner circumferential surface of the drum 112, to prevent the end plate 212 from falling off from the drum 112, and a C-shaped snap ring 216 is fitted in this annular groove 214. Note that, while the C-shape is shown as an annular shape with a part that is non-continuous, it may be a circular shape or a cornered shape.

Figure 4:
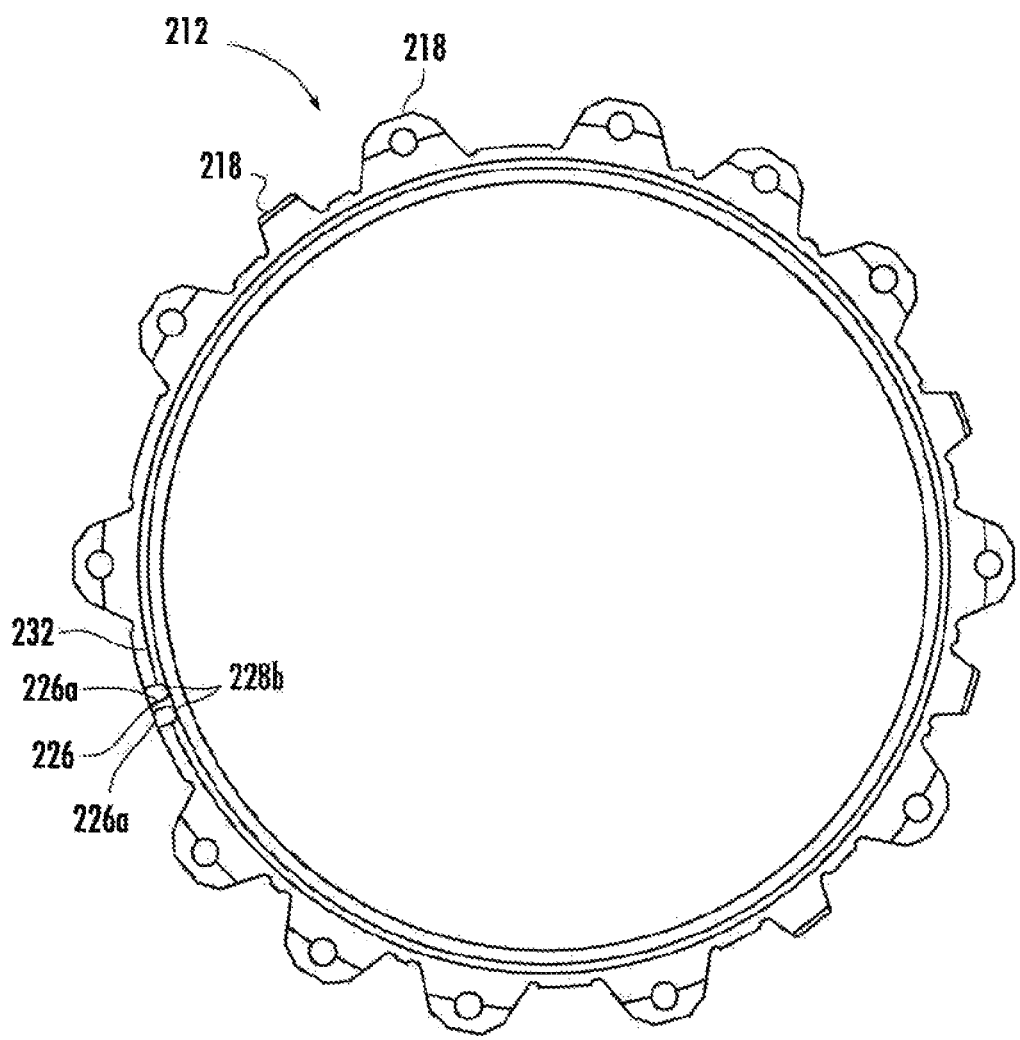
FIG. 4 is an explanatory view that shows an end plate of the present embodiment from an axial direction.

FIG. 4 shows the end plate 212 of the present embodiment from an axial direction. As shown in FIG. 4, a plurality of projecting sections 218 projecting in a radial direction toward the outside are provided at intervals in a circumferential direction on the end plate 212.

Figure 5:
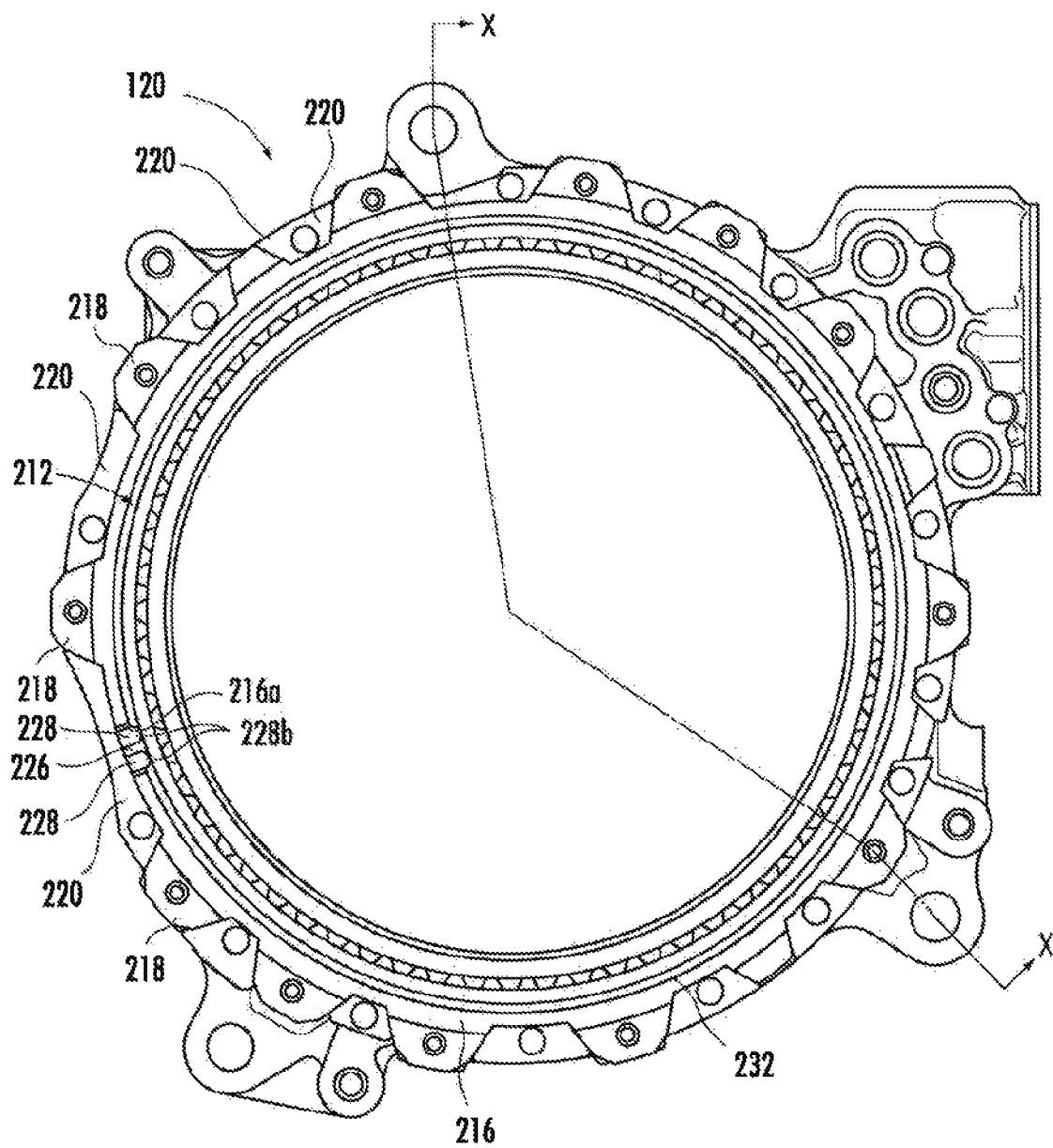
FIG. 5 is an explanatory view that shows, from a snap ring side of an axial direction, a state where the end plate of the present embodiment is attached to a drum.
Figure 6:
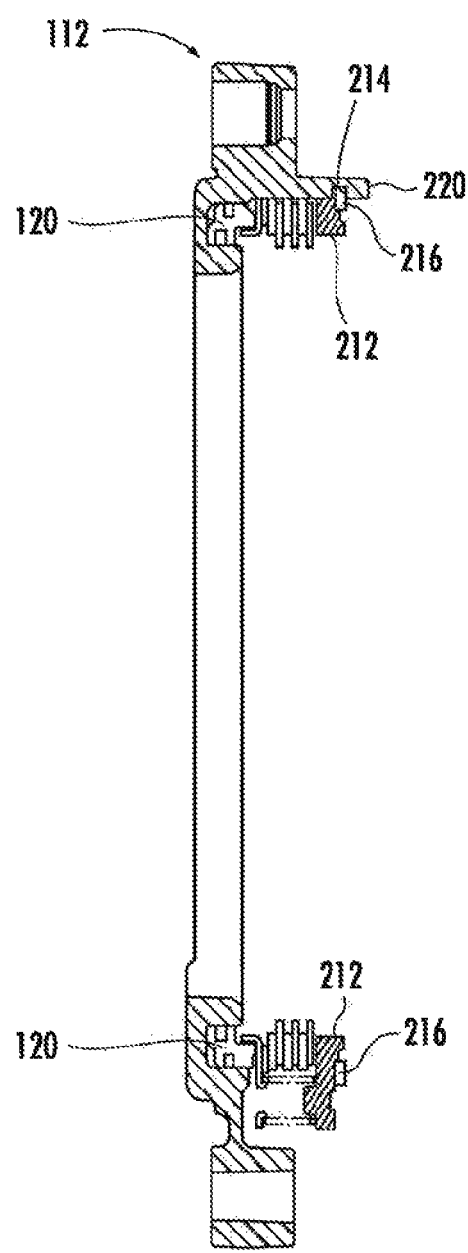
FIG. 6 is a cross-sectional view cut across an X-X line that shows a cross-section cut by the X-X line of FIG. 5.

FIG. 5 shows, from the snap ring 216 side of an axial direction, a state where the end plate 212 of the present embodiment is attached to the drum 112 and stopped by the snap ring 216. FIG. 6 shows a cross-sectional view cut across the X-X line of FIG. 5.

Figure 7:
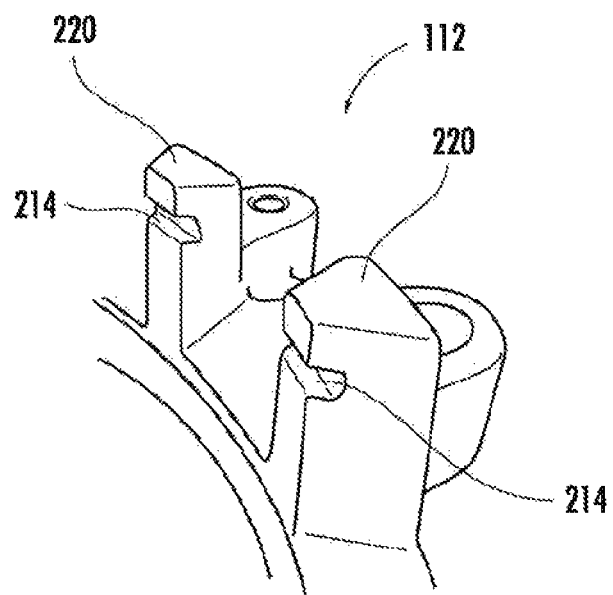
FIG. 7 is a perspective view that shows hook parts fitted with projecting sections of the drum.

FIG. 7 is a perspective view that shows hook parts 220 fitted with the projecting sections 218 of the drum 112. The projecting sections 218 are fitted between the hook parts 220.

The annular groove 214 of the drum 112 of the present embodiment is provided in these hook parts 220. Accordingly, since the hook parts 220 are not at the positions of the projecting sections 218, the annular groove 214 also cannot be formed at these positions.

Figure 8:
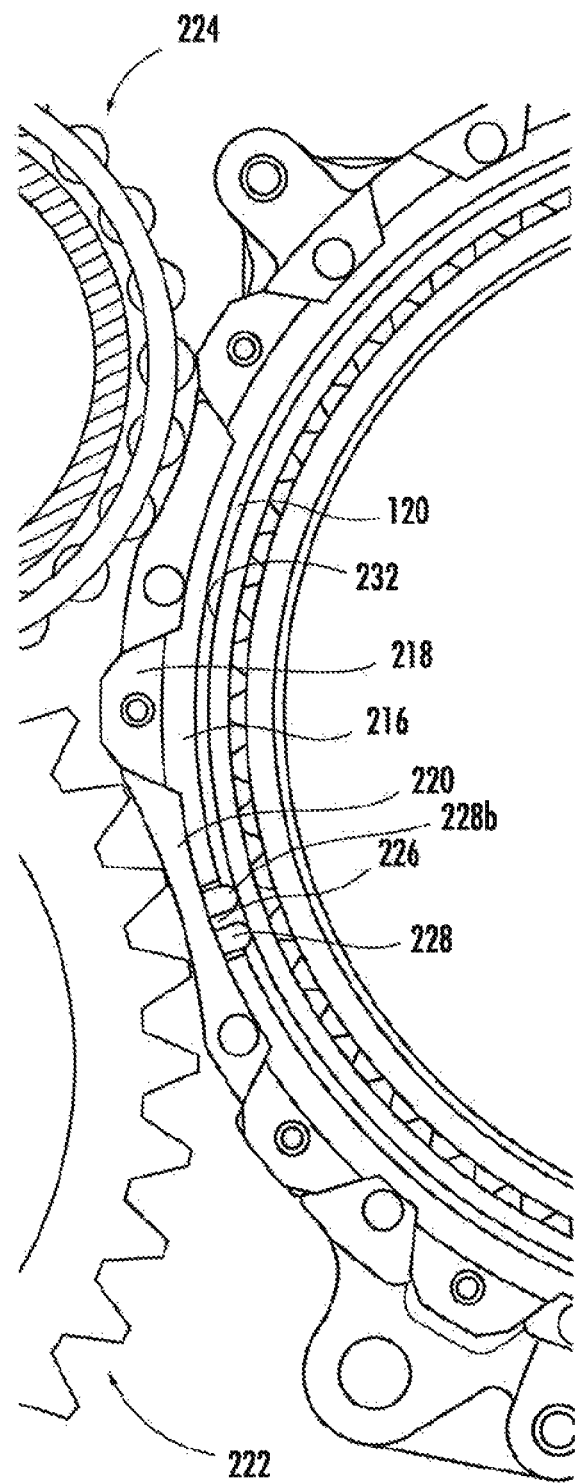
FIG. 8 is an explanatory view that shows a portion where the projecting sections cannot be provided by a gear or bearing.

FIG. 8 shows a portion where the projecting sections 218 cannot be provided by a gear 222 and a bearing 224.

Figure 9:
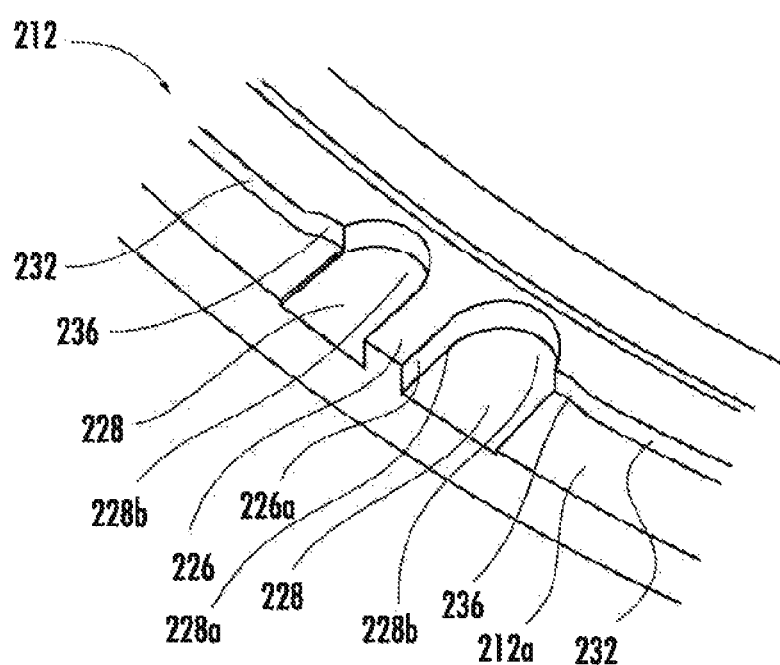
FIG. 9 is a perspective view that enlargedly shows a circumferential direction abutting section provided in the end plate.

FIG. 9 is a perspective view that enlargedly shows a circumferential direction abutting section 226 provided in the end plate 212.

Figure 10:
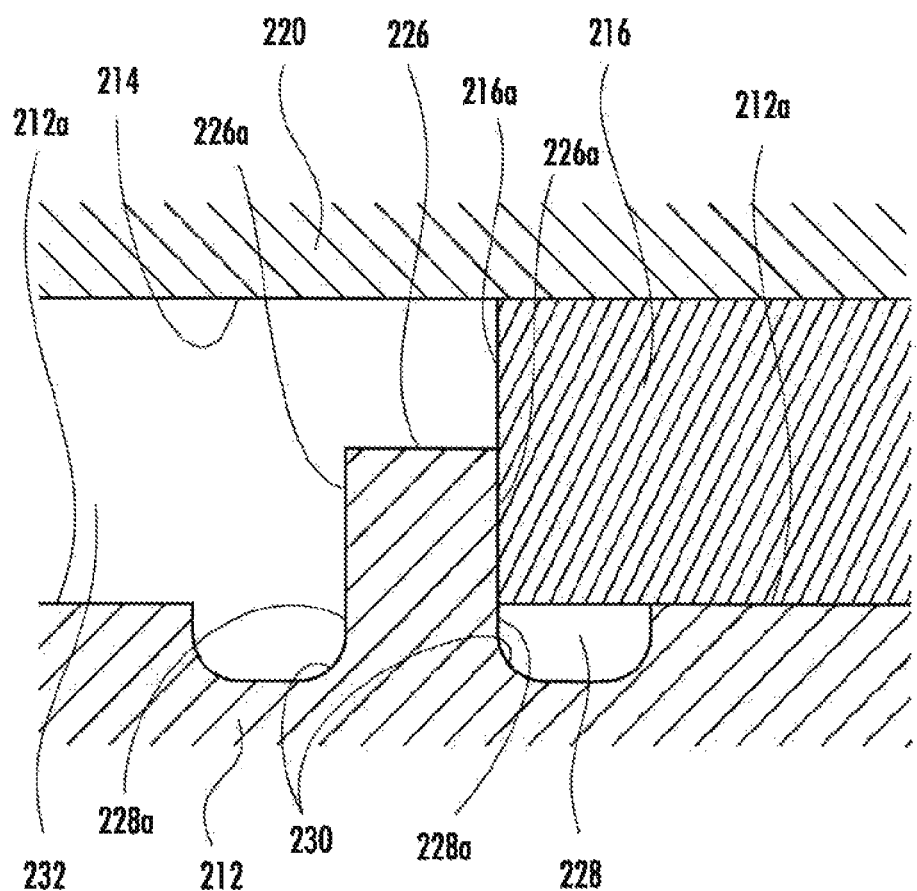
FIG. 10 is an explanatory view that shows a state where circumferential direction end of the snap ring are abutting with the circumferential direction abutting section.

FIG. 10 is an explanatory view that shows a state where circumferential direction end 216a of the snap ring 216 are abutting with an abutting surface 226a of the circumferential direction abutting section 226. As is clear from FIG. 10, a concave part 228, which inhibits contact with the circumferential direction end 216a of the snap ring 216, is provided at a connection portion between an axial direction surface 212a of the end plate 212 and the circumferential direction abutting section 226.

The concave part 228 includes a plane surface on a same plane surface (same plane surface 228a) as the abutting surface 226a of the circumferential direction abutting section 226 that abuts with at least one of the circumferential direction end 216a of the snap ring 216. Moreover, the concave past 228 is recessed in an axial direction of the end plate 212.

By this concave part 228, contact between a curved surface that may possibly be formed at a connection portion between the axial direction surface 212a of the end plate 212 and the circumferential direction abutting section 226, and the circumferential direction end 216a of the snap ring 216, can be inhibited. Therefore, the circumferential direction end 216a of the snap ring 216 can be prevented from moving, by having the circumferential direction end 216a of the snap ring 216 contact with this curved surface.

Moreover, if the concave part, is recessed in a circumferential direction by a base end portion of the circumferential direction abutting section 226, processing work for forming the concave part will be separately required, in addition to processing work of the circumferential direction abutting section 226, and this will be troublesome. Accordingly, in the present embodiment, by the concave part 228 having the same plane surface 228a, and being formed to be recessed in an axial direction of the end plate 212, the concave part 228 can be formed in the same process as the forming work of the circumferential direction abutting section 226. Therefore, in the present embodiment, the processing work of the concave part 228 can be facilitated along with improving the durability of the circumferential direction abutting section 226, compared to making the thickness of the circumferential direction abutting section 226 thin by making the concave part depressed in a circumferential direction.

Figure 11:
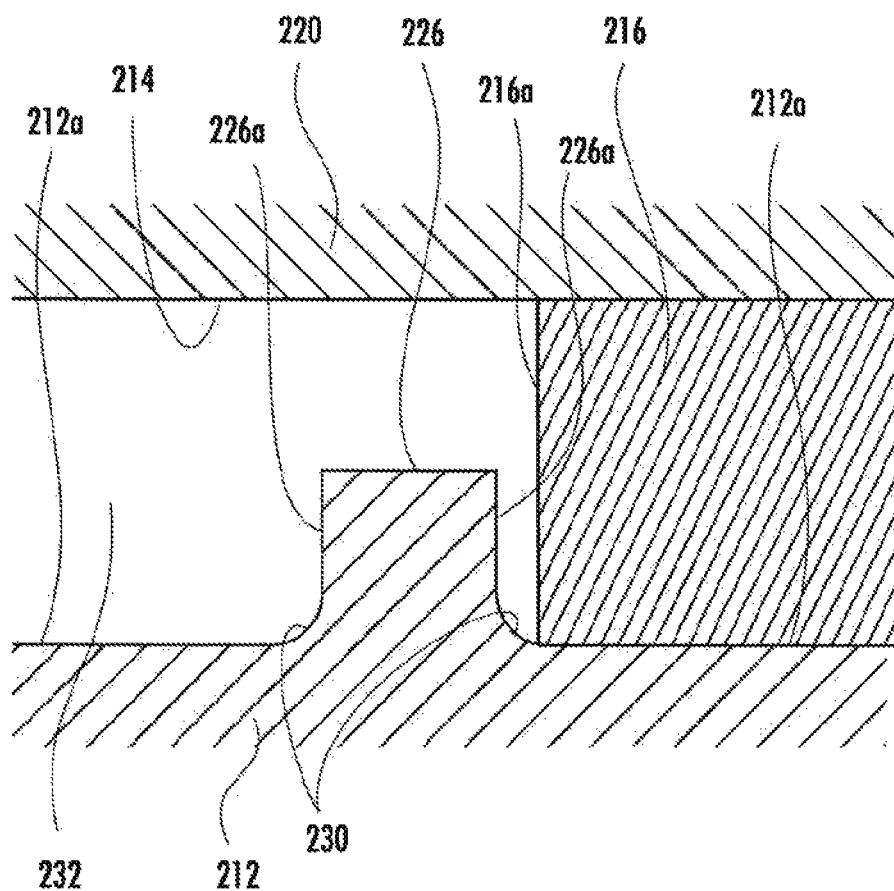
FIG. 11 is an explanatory view that shows a case where a concave part is not provided, as a comparative example.

FIG. 11 is an explanatory view that shows a case where the concave part 228 is not provided, as a comparative example. As shown in the comparative example of FIG. 11, in the case where the concave part 228 is not formed, there is the possibility that a curved surface 230 will be formed at a connection portion between the axial direction surface 212a of the end plate 212 and the circumferential direction abutting section 226. If the curved surface 230 is formed such as in the comparative example of FIG. 11, there is the possibility that the circumferential direction end 216a of the snap ring 216 will move in an axial direction, by having the circumferential direction end 216a of the snap ring 216 contact with this curved surface 230.

Moreover, as shown in FIG. 12, it is preferable for the circumferential direction abutting section 226 to be set so that a distance between two of the circumferential direction end 216a of the snap ring 216 is narrower than a circumferential direction length dimension of the annular groove 214 formed in the hook parts 220, in a state where a distance between the adjacent projecting sections 218 is positioned at a location furthest away to fit the snap ring 216 in the annular groove 214.

By such a configuration, the two circumferential direction end 216a of the snap ring 216 can continue to remain within the annular groove 214, even if gradually displaced in a circumferential direction, by the snap ring 216 vibrating or the like, and position displacement of the snap ring 216 can be surely prevented.

A contraction limiting section 232 is provided in the end plate 212 so as to limit contraction of the snap ring 216 to the inside in a radial direction.

The concave part 228 is deeply indented toward the inside in a radial direction more than the contraction limiting section 232, and according to this, a deeply-bored part 228b is formed in the concave part 228. By this deeply-bored part 228b, the concave part 228 can be easily formed without considering the generation of burring of a connection portion between the concave part 228 and the contraction limiting section 232, compared to the case where the concave part 228 is formed shallowly toward the inside in a radial direction.

FIG. 13 shows, by dashed lines and dotted lines, a movement track of a milling process tool 234 in the case where forming the contraction limiting section 232 by the milling process tool 234. As shown in FIG. 13, by making the milling process tool 234 move slightly to the inside in a radial direction to form a clearance part 236 at a connection portion of the contraction limiting section 232 with the concave part 228, at a start time and end time of the process by the milling process tool 234, generated burring contacting with the snap ring 216 can be suppressed, by the clearance past 236, even if burring is generated between the concave part 228 and the contraction limiting section 232. In this way, damage to the snap ring 216 can be prevented.

According to the end plate 212 (annular member) stopping structure of the first brake B1 as a friction engaging device of the present embodiment, the circumferential direction end 216a of the snap ring 216 abut with the circumferential direction abutting section 226 from a circumferential direction. Therefore, rotation of the snap ring 216 can be prevented, regardless of expansion-contraction of the snap ring 216.

OTHER EMBODIMENTS

Note that, while a description has been made in the present embodiment where the end plate 212 is attached, non-rotatably relative to the drum 112, the end plate of the present invention is not limited to this. For example, the end plate may be attached non-rotatably relative to the hub. In this case, the projecting sections will project toward the inside in a radial direction.

Moreover, a description has been made in the present embodiment where the concave part 228 is recessed in an axial direction, and it is easy to improve the durability of the circumferential direction abutting section 226 and to process the concave part 228. However, the concave part of the present invention is not limited to this. For example, the concave part of the present invention may be recessed in a circumferential direction, or may be recessed not only in an axial direction, but also in a circumferential direction.

Moreover, a description has been made in the embodiments where hook parts 220 are used as the engagement sections of the present invention. However, the engagement sections of the present invention are not limited to this, and may be something else if having a structure that is non-rotatable relative to the support section by engaging with the projecting sections. For example, there may be a depressed part fitted with the projecting sections in a circumferential direction and capable of sliding in an axial direction.

REFERENCE SIGNS LIST 1 crankshaft
2 torque converter
3 automatic transmission (transmission mechanism)
4 front differential gear
10 transmission case (case)
11 input axle (input section)
13 output member (output section)
E engine (internal combustion engine, driving source)
PT power transmission device
WFL, WFR front wheel
WRL, WRR rear wheel
ECU speed change control device
PG1 first planetary gear mechanism
Sa sun gear (seventh element)
Ca carrier (eight element)
Ra ring gear (ninth element)
Pa pinion
PG2 second planetary gear mechanism
Sb sun gear (twelfth element)
Cb carrier (eleventh element)
Rb ring gear (tenth element)
Pb pinion
PG3 third planetary gear mechanism
Sc sun gear (first element)
Cc carrier (second element)
Rc ring gear (third element)
Pc pinion
PG4 fourth planetary gear mechanism
Sd sun gear (sixth element)
Cd carrier (fifth element)
Rd ring gear (fourth element)
Pd pinion
C1 first clutch
C2 second clutch
C3 third clutch
B1 first brake
B2 second brake
B3 third brake
F1 two-way clutch (switching mechanism)
V vehicle
21 idle gear
23 idle axle
25 final driving gear
27 final driven gear
31 handle
112 drum
114 outer plate
116 inner disk
118 hub
120 piston
122 piston arrangement section
124 hydraulic chamber
126 bolt
212 end plate
212a axial direction surface
214 annular groove
216 snap ring
216a circumferential direction end
218 projecting section
220 hook part
222 gear (another internal component)
224 bearing (another internal component)

226 circumferential direction abutting section
226a abutting surface
228 concave part
228a same plane surface
228b deeply-bored part
230 curved surface
232 contraction limiting section (expansion-contraction limiting section)
234 milling process tool
236 clearance part

What is claimed is:

1. An annular member stopping structure for a friction engaging device, comprising:
    an annular member;
    a plurality of projecting sections projecting in a radial direction at intervals in a circumferential direction on the annular member;
    a support section having engagement sections configured to engage with the projecting sections, the support section being non-rotatable relative to the annular member;
    an annular groove provided in the support section; and
    a C-shaped stopper ring configured to fit in the annular groove;
    wherein a circumferential direction abutting section capable of abutting with a circumferential direction end of the stopper ring is provided in the annular member,
    wherein a concave part configured to inhibit contact with the circumferential direction end of the stopper ring is provided at a connection portion between an axial direction surface of the annular member and the circumferential direction abutting section,
    wherein the concave part has a plane surface on a same plane surface as an abutting surface of the circumferential direction abutting section configured to abut with the circumferential direction end of the stopper ring, and is recessed in an axial direction of the annular member,
    wherein the concave part comprises a deeply-bored part indented in a radial direction,
    wherein an expansion-contraction limiting section capable of abutting with the stopper ring from a radial direction so as to limit an expansion or contraction in a radial direction of the stopper ring is provided in the annular member, and
    wherein a clearance part having a clearance recessed in the radial direction so as to inhibit contact with an inner or outer circumference of the stopper ring is provided at a connection part between an abutting surface of the expansion-contraction limiting section capable of abutting with the stopper ring and the deeply-bored part of the concave part.

2. The annular member stopping structure for a friction engaging device according to claim 1,
    wherein the circumferential direction abutting section is provided between adjacent projecting sections, and
    wherein an interval between the circumferential direction ends of the stop ring is set to be smaller than an interval between the circumferential directions of the projecting sections.

3. The annular member stopping structure for a friction engaging device according to claim 1,
    wherein the circumferential direction abutting section is disposed at a location where an interval in the circumferential direction between adjacent two of the projecting sections is longest.

4. The annular member stopping structure for a friction engaging device according to claim 1,
    wherein the circumferential direction abutting section is provided near a gear.

5. The annular member stopping structure for a friction engaging device according to claim 1,
    wherein the clearance part is shallower than the deeply-bored part in the radial direction.

* * * * *